United States Patent
Haroldsen et al.

(10) Patent No.: US 10,655,284 B2
(45) Date of Patent: May 19, 2020

(54) STEERABLE SYSTEM FOR ASPHALT MILLING ATTACHMENT

(71) Applicant: Asphalt Zipper, Inc., Pleasant Grove, UT (US)

(72) Inventors: J. Tron Haroldsen, Herriman, UT (US); Matthew H. Taylor, Pleasant Grove, UT (US)

(73) Assignee: Asphalt Zipper, Inc., Pleasant Grove, UT (US)

( * ) Notice: Subject to any disclaimer, the term of this patent is extended or adjusted under 35 U.S.C. 154(b) by 0 days.

(21) Appl. No.: 16/148,910

(22) Filed: Oct. 1, 2018

(65) Prior Publication Data

US 2019/0032287 A1 Jan. 31, 2019

Related U.S. Application Data

(63) Continuation-in-part of application No. 13/686,461, filed on Nov. 27, 2012, now Pat. No. 10,086,867.

(60) Provisional application No. 61/565,278, filed on Nov. 30, 2011.

(51) Int. Cl.
| | |
|---|---|
| *E01C 23/088* | (2006.01) |
| *E01C 19/00* | (2006.01) |
| *B62D 3/14* | (2006.01) |
| *B62D 5/06* | (2006.01) |
| *B62D 7/16* | (2006.01) |
| *B62D 5/12* | (2006.01) |
| *B62D 1/00* | (2006.01) |
| *B62D 13/00* | (2006.01) |

(52) U.S. Cl.
CPC .............. *E01C 23/088* (2013.01); *B62D 1/00* (2013.01); *B62D 3/14* (2013.01); *B62D 5/062* (2013.01); *B62D 5/12* (2013.01); *B62D 7/16* (2013.01); *B62D 13/00* (2013.01); *E01C 19/006* (2013.01); *B60G 2300/09* (2013.01); *E01C 2301/00* (2013.01)

(58) Field of Classification Search
CPC ............................. E01C 23/088; E01C 23/127
See application file for complete search history.

(56) References Cited

U.S. PATENT DOCUMENTS

| | | | | | |
|---|---|---|---|---|---|
| 3,556,242 | A | * | 1/1971 | Dollase | B62D 5/093 180/406 |
| 3,697,135 | A | * | 10/1972 | Hatcher | E01C 23/088 299/39.4 |
| 3,779,608 | A | * | 12/1973 | Hatcher | B23D 59/02 299/39.4 |
| 4,878,713 | A | * | 11/1989 | Zanetis | E01C 23/088 299/39.5 |
| 4,896,995 | A | * | 1/1990 | Simmons | E01C 23/088 299/39.1 |

(Continued)

*Primary Examiner* — Janine M Kreck
(74) *Attorney, Agent, or Firm* — Michael F. Krieger; Kirton McConkie

(57) ABSTRACT

A steering mechanism and guidance system for a milling attachment device provides steering capability without impeding cutting depth control. The steering mechanism has at least one wheel that is rotated by an actuating mechanism such as an extending cylinder, synchronized actuators, or the like. The steering mechanism may be integrated with depth control by using a parallelogrammic structure with pivot points to assist in the depth control or may operate independent of and without impeding depth control.

14 Claims, 9 Drawing Sheets

(56) References Cited

U.S. PATENT DOCUMENTS

| | | | | |
|---|---|---|---|---|
| 4,909,575 A | * | 3/1990 | Lupton | ............... E01C 23/088 |
| | | | | 180/24.02 |
| 10,086,867 B2 | * | 10/2018 | Haroldsen | ............... B62D 5/20 |
| 2005/0098668 A1 | * | 5/2005 | Bailey | ............... E01C 23/163 |
| | | | | 239/722 |

* cited by examiner

STEERABLE SYSTEM FOR ASPHALT MILLING ATTACHMENT

RELATED APPLICATIONS

This patent application is a continuation in part application claiming priority to U.S. patent application Ser. No. 13/686,461 which was filed Nov. 27, 2012, which claims priority to U.S. Provisional Patent Application No. 61/565,278 which was filed Nov. 30, 2011 and is hereby incorporated herein by this reference.

FIELD OF THE INVENTION

The present invention relates to systems and methods for milling asphalt. More specifically, the present invention relates to attachable systems and methods that improve milling by providing steering capability while maintaining depth control for a milling device.

BACKGROUND OF THE INVENTION

Portable asphalt milling attachments historically comprise two principal features. They have a way to control the depth that the milling attachment device cuts. They also have a way to facilitate the changing of bits mounted to a cutting wheel of the milling attachment device. However, such devices are quite heavy and can prove very difficult to steer and keep on line, particularly when the host vehicle is small or has difficulty moving very heavy objects.

BRIEF SUMMARY OF THE INVENTION

The present invention has been developed in response to the present state of the art, and in particular, in response to the problems and needs in the art that have not yet been fully solved by currently available asphalt milling/trenching attachments.

This disclosure provides steering capability that operates independent of or can be integrated with depth control and will not interfere with bit access.

The front of the machine has one or more steerable wheels that are controlled hydraulically, electrically, pneumatically, or by using any other suitable drive. The wheel or wheels may be of any suitable type, including caster-type wheels, and may be raised or lowered to maintain desired depth control in the milling/trenching process. In certain embodiments, the steerable wheels are disposed forward of the milling assembly such that they will not impede bit access for repair and/or replacement.

Asphalt milling devices are quite heavy and some are self-propelled. The self-propelled asphalt milling devices are steerable, but are extremely expensive and have limitations. Asphalt milling attachments can be attached to and maneuvered by a host vehicle, but heretofore the host vehicle provides the steering. Because asphalt milling attachments are quite heavy, smaller host vehicles or host vehicles that have difficulty moving very heavy objects have difficulty steering when a milling attachment is attached. The attachment embodiments disclosed herein facilitate maneuverability by providing a steering mechanism for the attachment. The asphalt milling attachments of the present disclosure could use a bucket slot in the rear of the asphalt milling attachment to allow a host vehicle to connect to it. Alternatively, other known quick-connects (JRB style, skid steer or balderson style) could be used. Host vehicles for the asphalt milling attachment could include back hoes, loaders, excavators, track hoes, skid steers and the like. However, without the steering capability provided in the present disclosure, steering the asphalt milling attachment or maintaining a desired line and milling depth can prove to be very difficult for an operator of the device, particularly if the host vehicle is a smaller vehicle. The present invention is much more versatile than known asphalt milling devices because it provides steering capability for the asphalt milling attachment that can be attached to and used by broader range of host vehicles. In one embodiment, the wheel is a caster wheel that can be locked into a particular orientation (such as directly forward) or unlocked so that the operator can steer the device right or left. In some embodiments, the steering capability is independent of the depth control, and does not interfere with depth control. In other embodiments the steering is integrated with the depth control such as when the wheel is also connected to a framework that can be raised or lowered to assist in controlling the depth of the milling performed by the device.

With the steerable wheel system in use, the intended use of the asphalt milling device could be to cut asphalt, concrete or any other road construction/parking lot material. The milling device could also be used for soil stabilization. It could be used for full depth reclamation of roads. These and other features will become more fully apparent from the following description, or may be learned by the practice of the steerable wheel system as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of exemplary embodiments of the invention, briefly described above, will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Exemplary embodiments of the invention will be best understood by reference to the drawings, wherein like parts are designated by like numerals throughout. It will be readily understood that the components of steerable asphalt milling devices, as generally described and illustrated in the figures herein, could be arranged and designed in a wide variety of different configurations. Thus, the following more detailed description of the embodiments of the present disclosure, as represented in the figures, is not intended to limit the scope of the invention, as claimed, but is merely representative of exemplary embodiments of the invention.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

In this application, the phrases "connected to", "coupled to", and "in communication with" refer to any form of interaction between two or more entities, including mechanical, hydraulic, electrical, magnetic, electromagnetic, and pneumatic interactions.

The phrases "attached to", "secured to", and "mounted to" refer to a form of mechanical coupling that restricts relative translation or rotation between the attached, secured, or mounted object, respectively.

The term "pivoting" refers to items that rotate about an axis. A "pivoting engagement" is an engagement between two or more items in direct contact, with one or more of the items being capable of pivoting about an axis common to each of the items.

Figure 1:
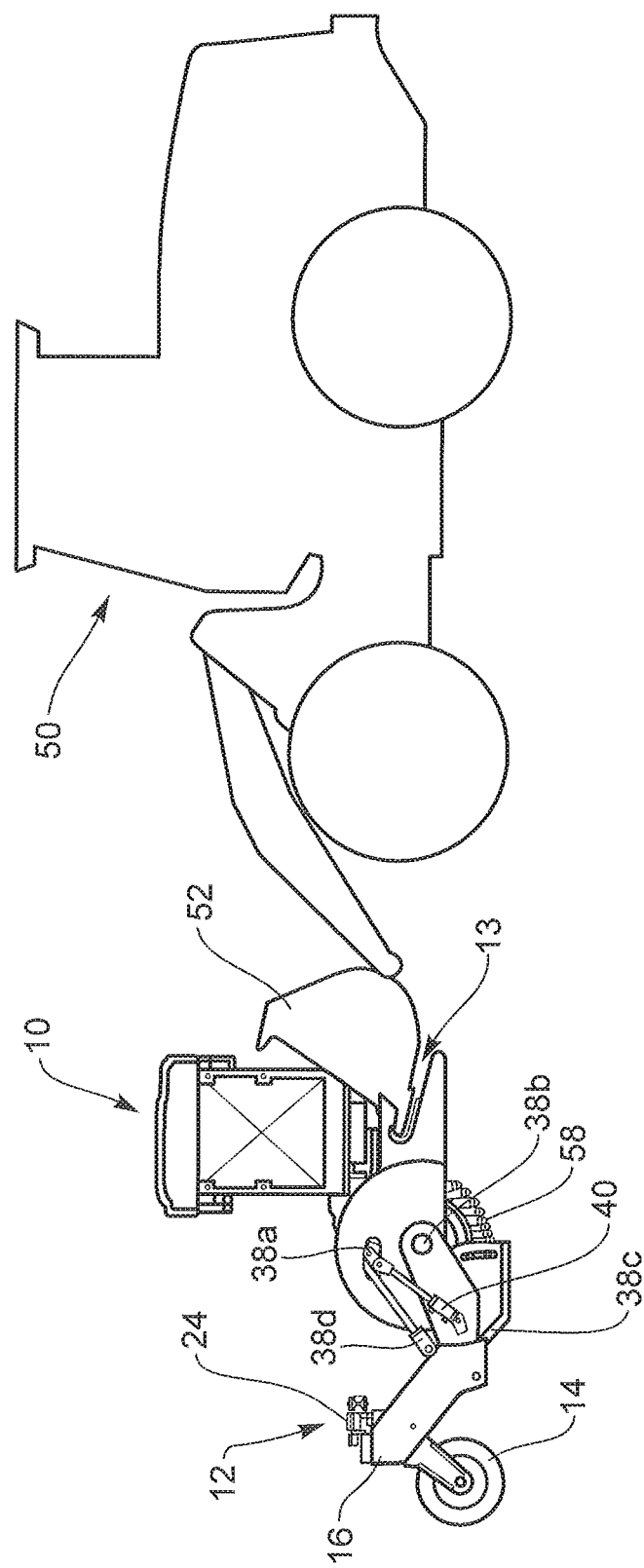
FIG. 1 is an elevation view of an asphalt milling device with a steering mechanism and showing a host vehicle in outline to illustrate one exemplary method for connecting the host vehicle to the asphalt milling device.

FIG. 1 is an elevation side view of an embodiment of an asphalt milling device 10 with a steering mechanism 12 and is shown as attached to an exemplary host vehicle 50. This embodiment shows that the asphalt milling device 10 is an attachment that is connected to a bucket-type of host vehicle 50 that can be used to drive and steer the device 10. The host vehicle 50 has a bucket 52 that engages a bucket slot 13 on the asphalt milling device 10. Alternatively, known quick-connects (JRB style, skid steer or balderson style) can be used to connect the host vehicle 50 to the asphalt milling device 10. Because the asphalt milling device 10 has a steering mechanism, various types of host vehicles 50 can be used to connect to and steer the steerable asphalt milling device 10, including back hoes, loaders, excavators, track hoes, skid steers and the like.

Figure 2:
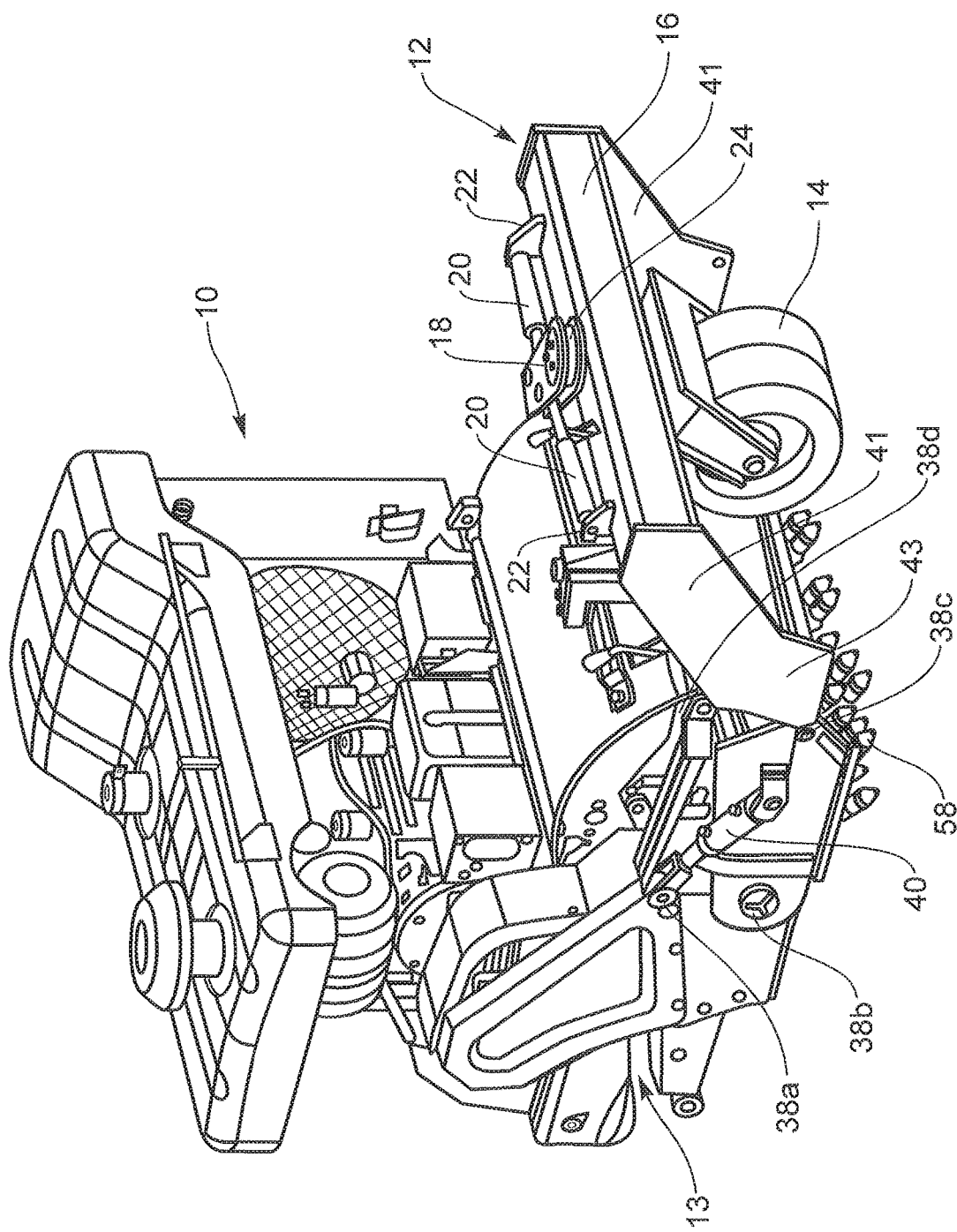
FIG. 2 is a perspective view of an exemplary asphalt milling device with a steering mechanism.

FIG. 2 is a perspective view of an exemplary asphalt milling device 10 with the steering mechanism 12 ready for connection to the host vehicle 50. The steering mechanism 12 comprises a wheel 14 pivotally mounted to a support bar 16 via a substantially vertically disposed pivot shaft 18, a pair of cooperating, steering actuators 20, a pair of stationary brackets 22, a rotating bracket 24, and a hydraulic drive (not shown). In FIG. 2, the wheel 14 is a caster-type wheel securely connected to the pivot shaft 18 so that when the pivot shaft 18 rotates, the wheel 14 also rotates. It should be understood that other types of wheels can be used, but the caster-type wheel 14, as shown in FIGS. 2 and 3, is particularly suitable for the intended use.

The pivot shaft 18 is carried in a shaft opening in the support bar 16 and extends above the support bar 16 so that the rotating bracket 24 can be attached to the pivot shaft 18. The rotating bracket 24 comprises a collar 28 and laterally extending ears 30 (the reference numerals 28, 30 are not shown in FIG. 2 so not to obscure other features of the device; however, collar 28 and ears 30 may be similar to what is shown in FIG. 3). The collar 28 fits snug about the pivot shaft 18 and can be secured to the pivot shaft 18 by any suitable means, such as by screw, bolt, key, set screw, weld, or the like. Ears 30 provide a location for pivotally attaching the cooperating steering actuators 20. Each of the stationary brackets 22 is secured to the support bar 16 and spaced to provide locations for pivotally attaching the cooperating steering actuators 20. One end of each steering actuator 20 is pivotally attached to a stationary bracket 22 while the other end is pivotally attached to ears 30 of the rotating bracket 24, so that distance between the two stationary brackets 22 is covered by the ears 30 and steering actuators 20, with the ears 30 being disposed between the two steering actuators. In this manner, as one of the steering pistons 20 contracts, the other steering piston 20 extends, thereby causing the ears 30 to move to the right or left and rotating the pivot shaft 18 and wheel 14 accordingly. A hydraulic drive (not shown in FIG. 2) is connected to the steering pistons 20 via hydraulic hoses and fittings 32 (not shown in FIG. 2). By regulating the extension and contraction of the steering actuators 20 via the delivery of hydraulic fluid through the hoses and fittings 32, the user can steer the wheel 14 in a desired direction. Although a hydraulic drive is disclosed, it should be understood that other types of drives may suitably rotate the pivot shaft 18, thereby steering the wheel 14.

Figure 3:
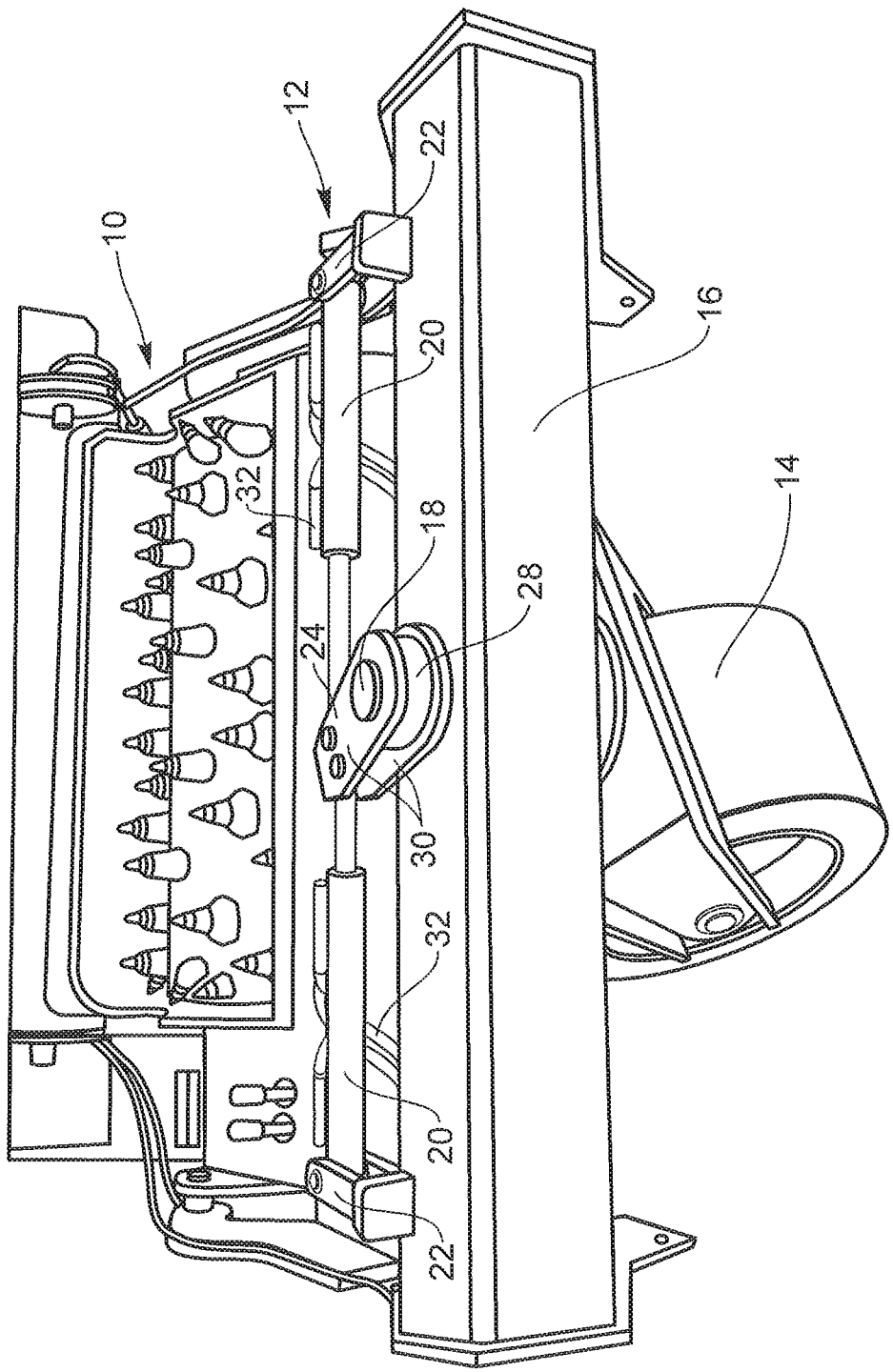
FIG. 3 is a perspective frontal view of an asphalt milling device showing various components of an exemplary steering mechanism.

FIG. 3 is a perspective frontal view of an exemplary embodiment of an exemplary asphalt milling device 10. The steering mechanism 12 comprises a wheel 14 pivotally mounted to a support bar 16 via a substantially vertically disposed pivot shaft 18, a pair of cooperating, steering actuators 20, a pair of stationary brackets 22, a rotating bracket 24, and a hydraulic drive (not shown). In FIG. 3, the wheel 14 is a caster-type wheel securely connected to the pivot shaft 18 so that when the pivot shaft 18 rotates, the wheel 14 also rotates. It should be understood that other types of wheels can be used, but the caster-type wheel 14 is particularly suitable for the intended use.

The pivot shaft 18 is carried in a shaft opening in the support bar 16 and extends above the support bar 16 so that the rotating bracket 24 can be attached to the pivot shaft 18. The rotating bracket 24 comprises a collar 28 and laterally extending ears 30. The collar 28 fits snug about the pivot shaft 18 and can be secured to the pivot shaft 18 by any suitable means, such as by screw, bolt, key, set screw, weld, or the like. Ears 30 provide a location for pivotally attaching the cooperating steering actuators 20. Each of the stationary brackets 22 is secured to the support bar 16 and spaced to provide locations for pivotally attaching the cooperating steering actuators 20. One end of each steering actuator 20 is pivotally attached to a stationary bracket 22 while the other end is pivotally attached to ears 30 of the rotating bracket 24, so that distance between the two stationary brackets 22 is covered by the ears 30 and steering actuators 20, with the ears 30 being disposed between the two steering actuators. In this manner, as one of the steering actuators 20 contracts, the other steering actuator 20 extends, thereby causing the ears 30 to move to the right or left and rotating the pivot shaft 18 and wheel 14 accordingly. As shown in FIG. 3, the steering actuators 20 are hydraulic pistons. However, it is contemplated that the steering actuators 20 may be electrical, pneumatic, or may be powered by any other suitable drive without departing from the concepts of the invention contemplated. For clarity in the remaining description, the steering actuators 20 are hydraulic pistons, as shown.

The hydraulic drive (not shown in FIG. 3) is connected to the steering actuators 20 via hydraulic hoses and fittings 32. By regulating the extension and contraction of the steering actuators 20 via the delivery of hydraulic fluid through the hoses and fittings 32, the user can steer the wheel 14 in a desired direction.

Figure 4:
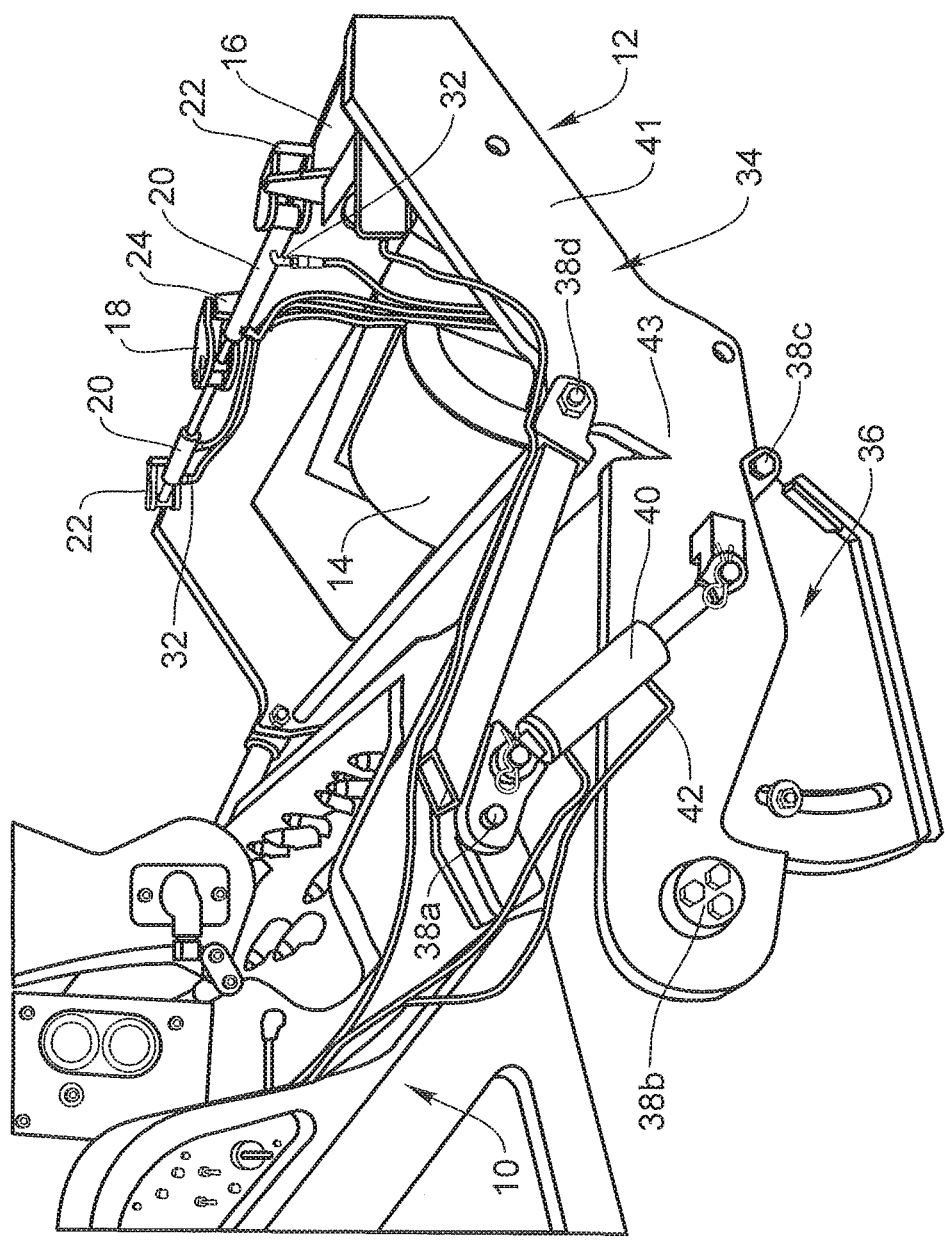
FIG. 4 is a perspective right side view of the steering mechanism for the asphalt milling device.
Figure 5:
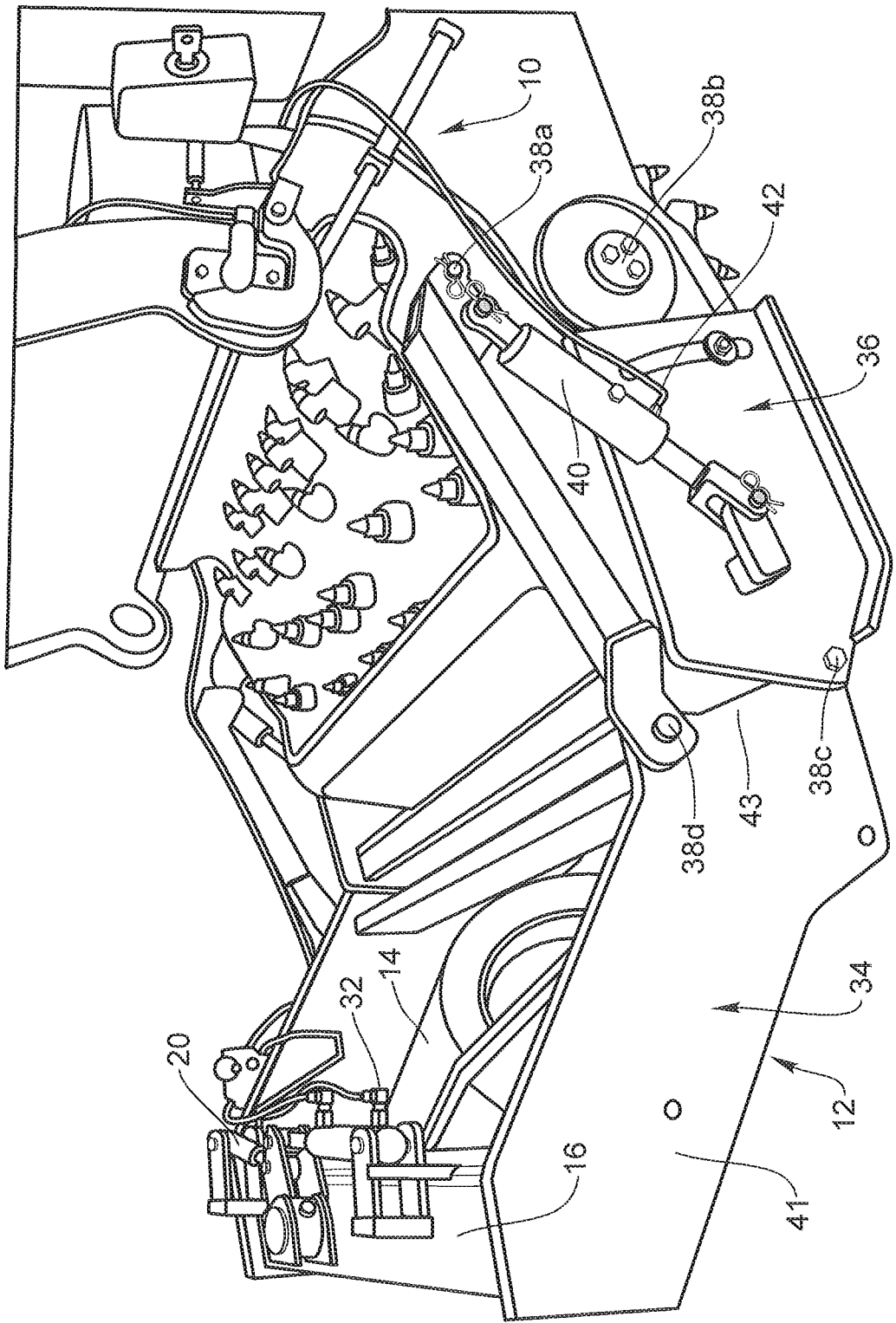
FIG. 5 is a perspective left side view of the steering mechanism for the asphalt milling device.

FIGS. 4 and 5 are perspective right side and left side views, respectively, of the steering mechanism 12, showing a height-adjustment mechanism 34 for the steering mechanism 12 Because the asphalt milling device 10 can mill to various depths, the height of the wheel 14 of the steering mechanism 12 is also adjustable to assist in maintaining depth control. In some embodiments, the wheel 14 can be raised and lowered using a pivoting parallelogrammatic structure, generally designed as 36, and comprising four pivot points 38a, 38b, 38c, and 38d. Between pivot points 38a and 38c, a height-adjusting strut such as a height-adjusting hydraulic piston 40 is provided. By extending and contracting the length of the height-adjusting strut (e.g., a hydraulic piston 40), the configuration of the parallelogrammatic structure 36 will change and the support bar 16 and wheel 14 can be raised and lowered to achieve a desired milling depth or to lift the front of the asphalt milling device 10 to clear a zero milling depth. Although a hydraulic piston 40 is shown, it should be understood that any type of height-adjusting strut that effectively alters its operating length with respect to the parallelogrammatic structure 36 may be used. Also, it should be understood by those skilled in the art that the height-adjusting strut can be connected to the parallelogrammatic structure 36 between points on the structure other than pivot points 38a and 38c, so long as the strut can still change the configuration of the structure 36 to raise and lower the support bar 16. By way of example of struts other than a hydraulic piston 40, the strut can be length-adjustable or telescoping linkage that is attached between adjacent sides of the parallelogrammatic structure 36.

As shown in both FIGS. 4 and 5, a support arm 41 is connected to the support bar 16 and a portion of the support arm 41 (designated as 43) forms one of the sides of the parallelogrammatic structure 36.

FIG. 4 also shows the hydraulic hoses and fittings 32 extending from the steering mechanism 12. Similarly, the height-adjusting hydraulic piston 40 has hoses and fittings 42. These hoses 32, 42 are connected to the hydraulic drive (not shown) which is controlled by control means known in the industry. However, it should be understood that more than one hydraulic drive (or any other type of suitable drive) may be used to drive the various driven components described herein.

Figure 6:
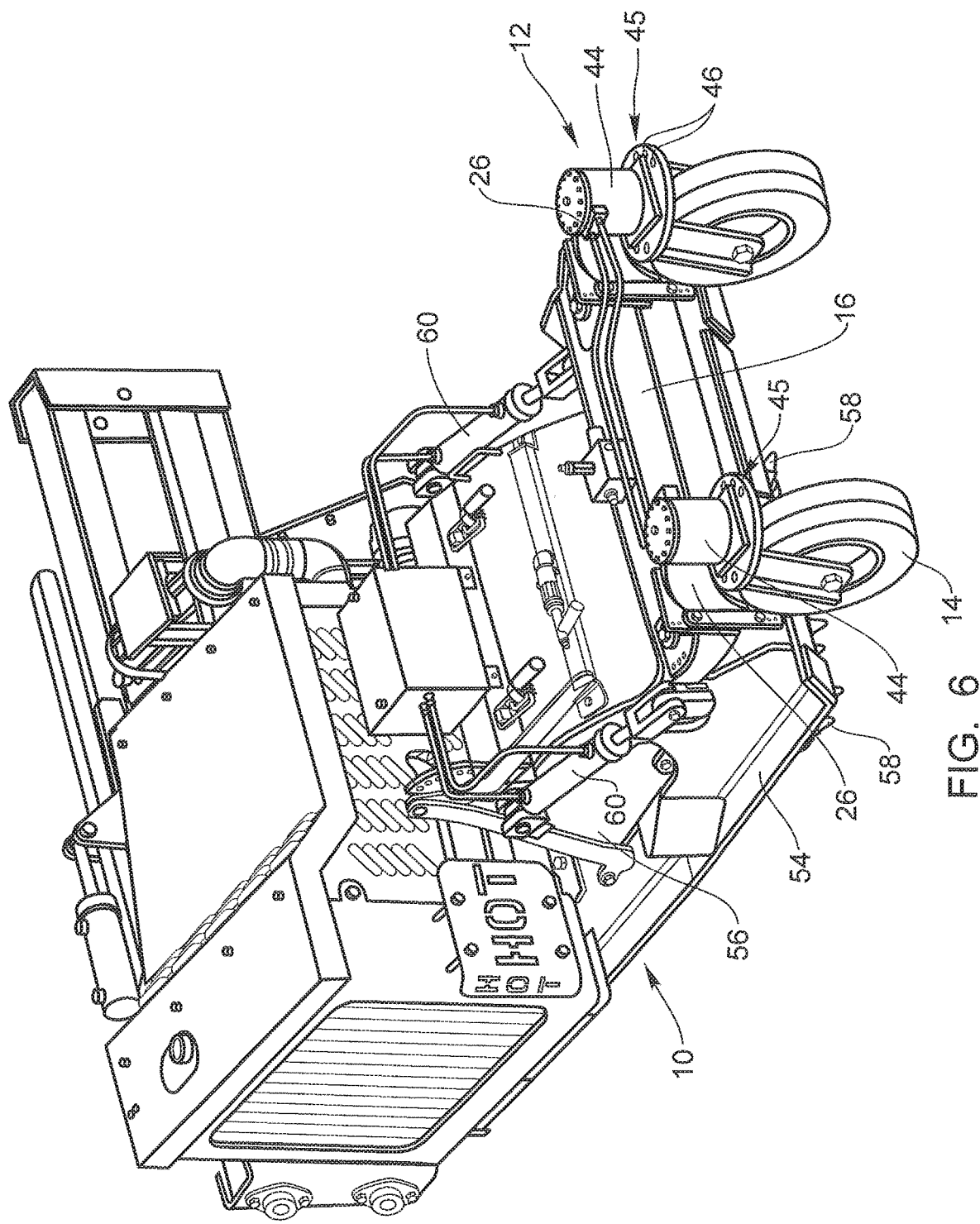
FIG. 6 is a perspective view of an alternative two-wheel embodiment of a steering mechanism for an alternate asphalt milling device showing the wheels in a forward mode.
Figure 7:
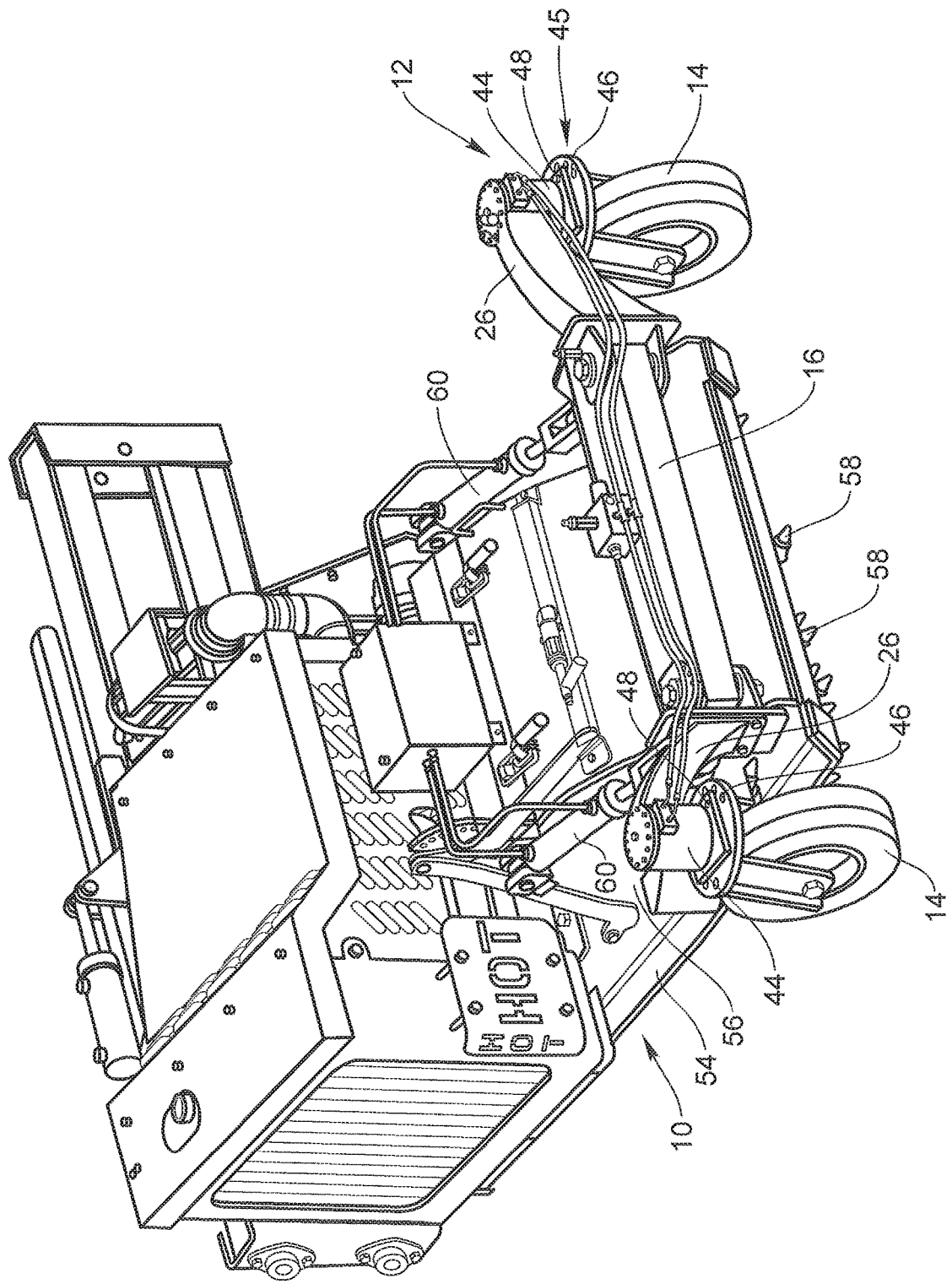
FIG. 7 is a perspective side view of the alternative two-wheel embodiment of the steering mechanism for the alternate asphalt milling device showing the wheels in a side mode.

FIGS. 6 and 7 are illustrations of an alternative embodiment, using a two-wheel configuration on an asphalt milling device 10, showing a different steering mechanism 12 and height control. With this alternative embodiment, each wheel 14 is mounted to an arm 26 that extends from the support bar 16. The pivot shaft 18 is encased within a cylinder 44 on the end of the arm 26. The direction of each wheel 14 can be controlled by independent synchronized actuator steering or can be locked, using a locking mechanism 45, into a particular direction manually (see e.g., the array of pin holes 46 and the locking pin hole 48 into which a locking pin (not shown) can be inserted). Independent synchronized actuator steering can be controlled hydraulically (hydraulic fittings 32 are shown in FIG. 6) to rotate the wheels 14 for steering. When a single, constant direction is desired, the locking mechanism 45 can be locked into a particular direction. Though the steering mechanism 12 differs from the single wheel embodiment described above, one skilled in the art can readily practice the two-wheeled embodiment based on the above disclosures and the figures shown.

The alternative embodiment of a two-wheel configuration for the asphalt milling device 10 of FIGS. 6 and 7 illustrates an embodiment where an outer frame 54 is rigid and is supported by the wheels 14 and an inner frame 56 that can hydraulically lift or lower the rotating cutting head 58 into place for milling at depths ranging from zero depth to full depth. The inner frame 56 is lifted/lowered so that the cutting head 58 is disposed in the desired cutting position by hydraulic struts 60 while the outer frame 54 maintains its disposition supported by the wheels 14 and the host vehicle 50.

Additionally, the arms 26 may pivot about their connections to the support arm 16 so that the wheels 14 can swing from a forward mode (FIG. 6) to a side mode (FIG. 7). When in the side mode, the cutter head 58 can advance much closer to a wall, an obstacle, a barrier, or the like, at the front of the asphalt milling device 10, while maintaining steering capability.

Although the exact configuration of the hydraulic drive together with the hoses and fittings, and the controls for regulating the hydraulic power have not specifically been shown, one skilled in the art, armed with the disclosure provided herein can configure the hydraulics to provide both steering and height-adjustment by locating needed controls in the host vehicle 50.

Figure 8:
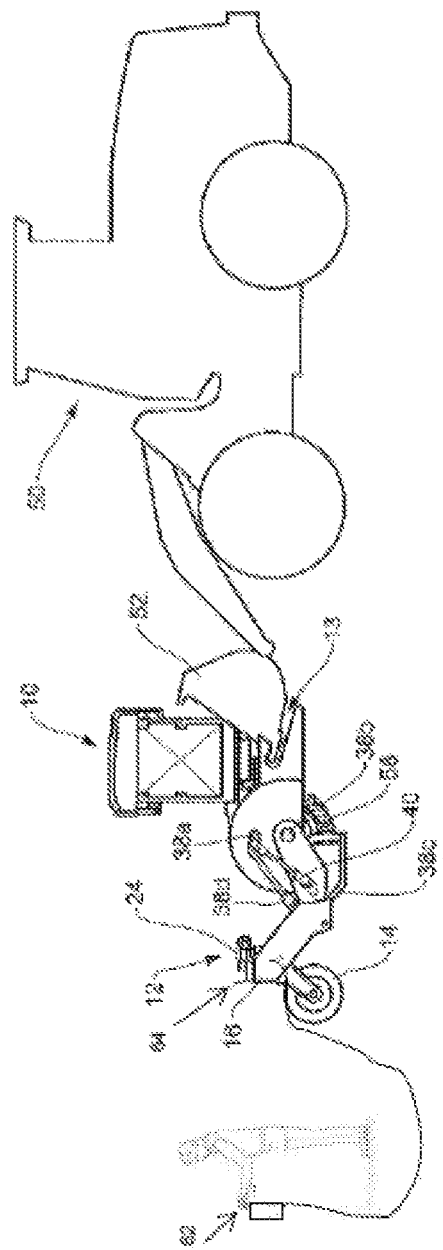
FIG. 8 is an elevation view of an asphalt milling device with a groundsman guiding a steering mechanism and showing a host vehicle in outline to illustrate one exemplary method for connecting the host vehicle to the asphalt milling device.
Figure 9:
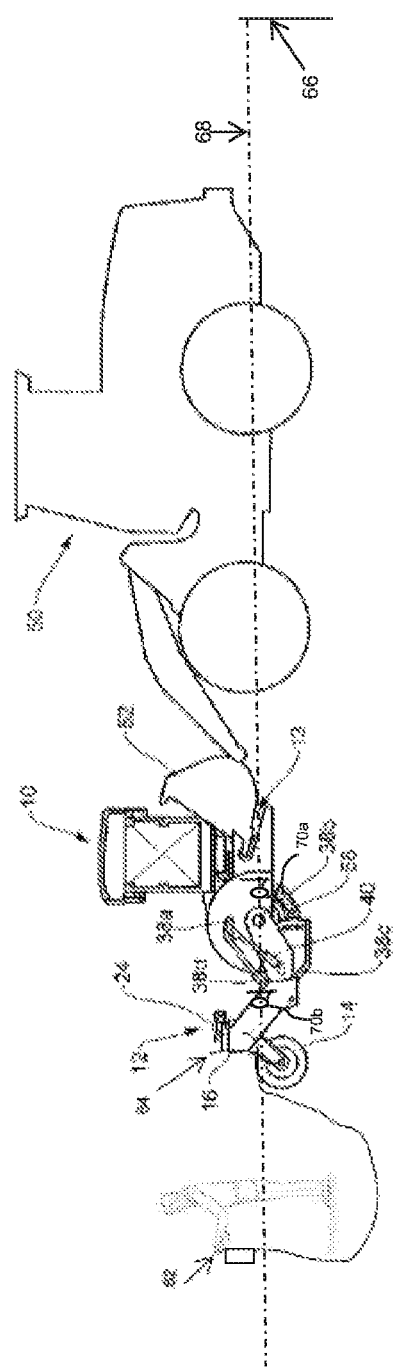
FIG. 9 is an elevation view of an asphalt milling device with a groundsman guiding a steering mechanism along a guidance system and showing a host vehicle in outline to illustrate one exemplary method for connecting the host vehicle to the asphalt milling device.

FIGS. 8-9 show a perspective view of another alternative asphalt milling device 10 further comprising a groundsman operator operating a guidance system 62. In certain embodiment the guidance mechanism comprises a light source 64 and a target. In certain embodiments the guidance system light source comprises a photoelectric sensor which emits a beam of visible or infrared light, including a laser beam, towards a target, such as a reflector, which when properly aligned reflects back a portion of the light beam to the sensor on the steering mechanism. In some embodiments the beam projector is mounted on the front of the steering mechanism. In some embodiments the beam projector is mounted above the steering mechanism on an extension.

A target is also provided. In embodiments involving shorter distance the target comprises a reflective surface so as to reflect an aligned light beam sent from the light source back to the photoelectric sensor. In certain embodiments involving longer distances the target is a sensor which receives an aligned light beam sent from the light source and transmit a signal via wires or wirelessly, that the beam is aligned. In certain embodiments the target comprises adjustable blinders which create an aperture between the light source and the target to ensure the desired milling depth has been achieved. In certain embodiments the blinder is used to set a vertical high limit. In some embodiments the lower limit is functionally set by the maximum milling depth set by the physical limitations of the milling attachment.

Some embodiments comprise a light beam projected on a sensing target wherein the target senses whether the position of the light beam is within pre-set tolerances. In some embodiments the guidance system provides an alert, such as a sound, a light or vibration to alert the operator the beam is out of alignment. In some embodiments the guidance system notifies the operator what corrective action required to realign the steering mechanism with the predetermined course. In some embodiments the steering mechanism become misaligned and require a steering correction. In some embodiments when the light beam is out of alignment the operator manually determines the cause of the misalignment and manually guides the steering mechanism into alignment. In some embodiments the guidance system may sense the beam moved off a specific side of the target (e.g. right) and thus indicate a steering correction (e.g. to the left) is required to regain alignment, or vice versa.

In some embodiments the guidance system is used to confirm the depth of the milling. In some embodiments the sensor may sense the beam moved vertically out of alignment and indicate the vertical misalignment to an operator. In some embodiments the vertical misalignment may be caused the material being milled. In the milling process the rotating cutting head may encounter materials of different hardness, and depending on the speed the rotating cutting head may pass over the material without properly milling or pulverizing the material. In some instances the progress of the host machine and milling attachment are stopped and possibly even reversed to permit the rotating cutting head to operate until the milling or pulverization is complete. In some embodiments the vertical misalignment may prompt the operator to put more pressure on the rotating cutting head. In some embodiments the increased pressure is accomplished by the host vehicle lowering the boom connected to the milling attachment, thus placing more of the host vehicle's weight on the milling attachment and forcing the rotating cutting into the material. The additional downward force will drive the cutting head 58 into the material being milled. In certain embodiments the ideal downward force on the milling attachment is created when the host vehicle's front wheels are almost off the ground.

FIG. 9 shows that in some embodiments the guidance system comprises a light beam 68, such as a laser emitted from a light source 66 aligned along the side of the milling path and a ring 70a and 70b, or a series of rings extending from the side of the milling attachment aligned so that the laser is directed through the center of the rings. In some embodiments a groundsman observes the alignment of the laser through the ring, and adjusts height or direction of the milling attachment as necessary to maintain the alignment of the milling attachment on the milling path. In some embodiments the guidance system comprises one or both of the guidance systems.

In some embodiments instead or lowering a boom to increase pressure the height-adjustment mechanism 34 can be adjusted completely mill the ground and realign the steering mechanism. Because the asphalt milling device 10 can mill to various depths, the height of the wheel 14 of the steering mechanism 12 is also adjustable to assist in maintaining depth control. In some embodiments, the wheel 14 can be raised and lowered using a pivoting parallelogrammatic structure, generally designed as 36, and comprising four pivot points 38a, 38b, 38c, and 38d. Between pivot points 38a and 38c, a height-adjusting strut such as a height-adjusting hydraulic piston 40 is provided. By extending and contracting the length of the height-adjusting strut (e.g., a hydraulic piston 40), the configuration of the parallelogrammatic structure 36 will change and the support bar 16 and wheel 14 can be raised and lowered to achieve a desired milling depth or to lift the front of the asphalt milling device 10 to realign the steering mechanism. The raising and lowering of the height-adjustment mechanism in response to sensed misalignment can be used to compensate for depressions in the ground's surface contours.

In some embodiments the steering guidance system further comprises remote steering member. In some embodiments the remote steering member comprises a relay remote control unit, configured to allow an operator to correct misalignments. In certain embodiments this relay remote comprises a notification mechanism which notifies the operator when the steering mechanism is misaligned. In some embodiments the relay remote comprises steering controls to direct the steering mechanism and correct for horizontal misalignment. In certain embodiments the relay remote comprises controls for the height-adjustment mechanism 34. In some embodiments the relay remote is used by the operator of the host vehicle to adjust the downward pressure on the boom. In some embodiments the relay remote is wirelessly connected to the guidance system. In some embodiments the relay remote is connected to the guidance system by a wire wherein the operator is a groundsman walking on the ground next to the steering mechanism to observe the position of the steering mechanism as it moves. In some embodiments the steering guidance system is configured in the host vehicle cab to allow the host vehicle operator to operate both the host vehicle and the steering mechanism, as well as the milling depth.

In some embodiments a steering mechanism control, along with a visual observation system is configured away from the front of the milling attachment, such as in the host vehicle's cab, to obviate the need for a groundsman. In some embodiments the visual observation system comprises one or more cameras positioned to provide a view of the milling attachment's direction. In some embodiments one or more observation members, such as cameras, is positioned to provide a view of the milling attachment's milling depth. In some embodiments one or more cameras is positioned to provide a view of the guidance system to visually indicate when the milling attachment is the correctly aligned. In some embodiments one or more visual, such as a LCD screen, LED screen, ELD screen, or phosphorous screen, displays the alignment of the milling attachment with the guidance system.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A steering mechanism to provide steering capability for both a host vehicle and for a milling attachment selectively separable from, but connectable to the host vehicle operated by an operator, the host vehicle providing propelling force to the milling attachment, the steering mechanism comprising:

a support bar disposed forward of and connected to a milling attachment forward of a rotating cutting head the support bar further comprising a wheel pivotally mounted to the support bar via a pivot shaft;

a first steering actuator connected to the pivot shaft;

a second steering actuator connected to the pivot shaft;
a laser guidance system positioned on the milling attachment and directed to a tolerance target set to sense the vertical and horizontal position of the milling attachment relative to the tolerance target; and
milling attachment steering controls positionable for access and actuation by a steering operator observing the laser guidance system to steer the milling attachment and the host vehicle allowing the steering operator to maintain a horizontal and vertical compliance, independent of the host vehicle operator, the steering controls being connected to the first steering actuator and second steering actuator of the steering mechanism allowing a steering operator to control steering of both the host vehicle and the milling attachment by activating the first steering actuator and the second steering actuator of the milling attachment.

2. A steering mechanism as in claim 1, further comprising a rotating bracket connected to the pivot shaft, the at least one steering actuator being connected to and providing powered rotary motion to the rotating bracket to thereby rotate the pivot shaft to steer the wheel.

3. A steering mechanism as in claim 1, wherein the steering actuator is a hydraulic piston and the powered driver is a hydraulic drive.

4. A steering mechanism as in claim 1, wherein the wheel is a caster wheel.

5. A steering mechanism as in claim 1, further comprising a height-adjustment mechanism for raising and lowering the support bar and wheel, the height-adjustment mechanism having a parallelogrammatic structure with pivot points, the configuration of the parallelogrammatic structure changes by the extension and contraction of a height-adjusting strut.

6. A steering mechanism as in claim 5, wherein the height-adjusting strut is a hydraulic piston.

7. A steering mechanism as in claim 5, further comprising at least one support arm connected to the support bar, at least a portion of the support arm being part of the parallelogrammatic structure.

8. A steering mechanism as in claim 1, further comprising a locking mechanism for locking the direction of the wheel into a particular direction.

9. A steering mechanism as in claim 8, wherein the locking mechanism comprises a plurality of pin holes, a locking pin hole, and a locking pin.

10. The milling attachment steering controls of claim 1 wherein the laser guidance system wirelessly steers the vehicle.

11. The milling attachment steering controls of claim 1 wherein the steering controls steer the vehicle using a wire enabling the operator to stand next to the milling attachment so as to adjust the position of the milling attachment as it operates.

12. A method for steering both a host vehicle and a milling attachment, wherein the milling attachment is configured to be selectively separable from, and connectable to the host vehicle, when the host vehicle and milling attachment are connected, comprising the steps of:
providing a wheel mounted to a pivot shaft, a support bar disposed forward of and connected to the milling attachment and receiving the pivot shaft in pivoting engagement;
connecting at least one steering actuator to the pivot shaft to provide rotary motion to the pivot shaft for steering the wheel;
controlling power to the at least one steering actuator to steer the wheel;
providing a height-adjustment mechanism having an adjustable parallelogrammatic structure with pivot points and a height-adjusting strut; and
adjusting the parallelogrammatic structure to raise and lower the support bar and the wheel.

13. The method of claim 12, wherein the wheel is a caster wheel.

14. The method of claim 12, wherein the wheel is connected to an arm that is pivotally connected to the milling attachment and further comprising the step of pivoting the arm to swing the wheel from a forward mode to a side mode.

* * * * *